United States Patent
Haldeman et al.

(10) Patent No.: US 12,473,084 B1
(45) Date of Patent: Nov. 18, 2025

(54) TEETERING ROTOR YOKE WITH PITCHED ARMS

(71) Applicant: Textron Innovations Inc., Providence, RI (US)

(72) Inventors: Andrew P. Haldeman, Richland Hills, TX (US); George M. Thompson, Southlake, TX (US); Jonathan A. Knoll, Alvarado, TX (US); Marco A. Agredano, Corinth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/903,192

(22) Filed: Oct. 1, 2024

(51) Int. Cl.
| | |
|---|---|
| *B64C 27/43* | (2006.01) |
| *B64C 27/33* | (2006.01) |
| *B64C 27/48* | (2006.01) |

(52) U.S. Cl.
CPC .............. *B64C 27/43* (2013.01); *B64C 27/33* (2013.01); *B64C 27/48* (2013.01)

(58) Field of Classification Search
CPC ......... B64C 27/43; B64C 27/45; B64C 27/41; B64C 27/48; B64C 27/32; B64C 27/33; B64C 27/04; B64C 11/04; B64C 11/06; B64C 11/08; B64C 11/12
USPC ................................................. 416/103, 104
See application file for complete search history.

(56) References Cited

U.S. PATENT DOCUMENTS

| | | | | |
|---|---|---|---|---|
| 4,349,316 A | * | 9/1982 | Hughes ................... | B64C 27/82 416/134 A |
| 4,708,591 A | * | 11/1987 | Roman .................... | B64C 27/41 416/102 |
| 4,759,689 A | * | 7/1988 | Roman .................... | B64C 27/41 416/102 |
| 5,645,400 A | * | 7/1997 | Hunter .................... | B64C 27/33 416/134 A |
| 8,956,117 B2 | * | 2/2015 | Stamps .................... | B64C 27/33 416/134 A |
| 10,502,262 B2 | * | 12/2019 | Stamps .................... | B64C 27/82 |
| 10,703,469 B2 | * | 7/2020 | Paulson ............... | B64C 29/0033 |
| 10,988,244 B2 | * | 4/2021 | Laflamme ............... | B64C 27/43 |
| 11,401,040 B2 | * | 8/2022 | Haldeman ................. | F01D 5/10 |
| 12,049,305 B1 | * | 7/2024 | Hinman .................. | B64C 27/72 |

(Continued)

FOREIGN PATENT DOCUMENTS

EP         3323719 B1 *  2/2019  ............. B64C 27/32

*Primary Examiner* — Courtney D Heinle
*Assistant Examiner* — Wesley Le Fisher
(74) *Attorney, Agent, or Firm* — Whitaker Chalk Swindle & Schwartz PLLC; Enrique Sanchez, Jr.; Juan Vasquez

(57) ABSTRACT

A teetering rotor assembly includes a rotor yoke and a plurality of rotor blades. The rotor yoke includes a hub portion that includes a shaft aperture and two teetering hinge cutouts. The rotor yoke further includes a plurality of pitched yoke arms. Each pitched yoke arm is coupled to the hub portion and includes one or more feathering bearings. Each pitched yoke arm includes a precone axis that is elevated at a precone angle relative to a plane of rotation of the rotor yoke. Each pitched yoke arm includes a twist axis that is twisted at a twist angle relative to the plane of rotation of the rotor yoke. Each rotor blade is configured to couple to a pitched yoke arm via the feathering bearings. Each rotor blade includes a root end that comprises a twisted shape to match the twist axis of a particular one of the pitched yoke arms.

20 Claims, 7 Drawing Sheets

(56) References Cited

U.S. PATENT DOCUMENTS

| | | | | |
|---|---|---|---|---|
| 2018/0290739 | A1* | 10/2018 | Mughal | B64C 11/06 |
| 2021/0316849 | A1* | 10/2021 | Thompson | B64C 27/48 |
| 2022/0126991 | A1* | 4/2022 | Acee | B64C 27/35 |

* cited by examiner

TEETERING ROTOR YOKE WITH PITCHED ARMS

TECHNICAL FIELD

The present disclosure relates generally to rotor yokes, and more particularly to a teetering rotor yoke with pitched arms.

BACKGROUND

Helicopters and other aerial vehicles utilize one or more rotor assemblies for lift and propulsion. These rotor assemblies are critical components that generate the aerodynamic forces necessary for flight. Rotor assemblies typically include multiple individual blades connected to a central yoke that is coupled to a motor shaft. For example, a typical rotor assembly may consist of two individual blades that are each connected to arms of a yoke with bolts. The number of blades can vary depending on the specific aircraft design and performance requirements.

Many rotor blades are manufactured to have complex shapes, twists, and curves in order to improve their efficiency and operation. These intricate geometries are configured to optimize lift generation, reduce drag, and enhance overall aerodynamic performance across various flight conditions. The rotor blade's airfoil shape, twist distribution, and planform are all factors that influence the rotor blade's performance characteristics.

In order to couple twisted blades to a typical yoke, the blade root (e.g., the portion of the blade that connects to the yoke) typically has an untwisted shape in order to mate with flat arms of the yoke. This design constraint results in even more complex shapes and geometries for blades since a large portion of the blade is twisted while the blade root remains untwisted. This transition from an untwisted root to a twisted blade body introduces additional manufacturing challenges and potential stress concentrations.

The complexity of rotor blade design and manufacturing has significant implications for aircraft performance, maintenance, and cost. More intricate blade geometries often require advanced manufacturing techniques, specialized tooling, and precise quality control measures. These factors can contribute to increased production costs and longer lead times for blade manufacturing.

Furthermore, the interface between the rotor blade and the yoke is a critical area that must withstand high loads and stresses during operation. The transition from an untwisted root to a twisted blade body can create stress concentrations that may impact the blade's structural integrity and fatigue life. This introduces complex and difficult considerations and potentially the use of additional reinforcement or specialized materials in the root area in order to address these issues.

Prior solutions to address these challenges have primarily focused on optimizing the blade design within the constraints of traditional flat yoke arms. Some approaches have involved using composite materials with tailored layups to achieve desired blade properties while maintaining an untwisted root. Others have explored the use of specialized root fittings or transition pieces to connect twisted blades to flat yoke arms.

Another approach has been to design blades with a more gradual twist distribution, reducing the severity of the transition between the untwisted root and the twisted blade body. However, this may compromise the blade's aerodynamic efficiency in other areas of its span.

SUMMARY

The present disclosure achieves technical advantages as a teetering rotor yoke with pitched arms. In embodiments, the teetering rotor yoke with pitched arms of embodiments addresses the challenges with current rotor technology as described above.

The improved system and assembly provided by embodiments of the present disclosure provide significant improvements in rotor system efficiency, blade design simplification, and overall performance. By incorporating pitched arms into a rotor yoke, a system or assembly implemented in accordance with the present disclosure may allow for more optimal blade geometries, potentially reducing manufacturing complexity and costs. The teetering rotor yoke with pitched arms of embodiments may also enhance aerodynamic efficiency, improve stress distribution, and increase the lifespan of rotor components. The improvements in rotor yoke technology provided by the teetering rotor yoke with pitched arms of embodiments has the potential to revolutionize rotorcraft technology, offering benefits that may extend to various types of aerial vehicles utilizing rotor systems for lift and propulsion.

In embodiments, a teetering rotor assembly may include a rotor yoke and a plurality of rotor blades. The rotor yoke may include a hub portion that includes a shaft aperture and two teetering hinge cutouts. In embodiments, the hub portion may be centrally located and may operate as the primary structural component of the rotor yoke. In some embodiments, the hub portion may include a shaft aperture, which may be a central opening configured to accommodate a motor shaft, a drive shaft, and/or other rotational mechanisms. In some embodiments, the hub portion may include two teetering hinge cutouts, which may include specially shaped recesses or openings positioned on opposite sides of the hub portion. These teetering hinge cutouts may facilitate the teetering motion of the rotor assembly, allowing for controlled tilting or flapping of the rotor blades during operation. In some embodiments, the teetering hinge cutouts may be configured to interface with teetering bearings or other components that enable the teetering action of the rotor assembly.

In embodiments, the rotor yoke may include a plurality of pitched yoke arms. Each pitched yoke arm may be coupled to the hub portion of the rotor yoke and may include one or more feathering bearings. In embodiments, each of the pitched yoke arms may be configured with several geometric features. For example, each pitched yoke arm may include a precone axis that is elevated at a precone angle relative to a plane of rotation of the rotor yoke. This precone angle may be configured to reduce steady bending stresses and optimize loading characteristics. In some embodiments, another geometric feature of the pitched yoke arms may include that each pitched yoke arm may include a twist axis that is twisted at a twist angle relative to the plane of rotation of the rotor yoke. This twist angle may allow for improved attachment of rotor blades with twisted geometries.

In embodiments, each of the rotor blades of the plurality of rotor blades of the teetering rotor assembly may be configured to couple to a pitched yoke arm of the pitched yoke arms via feathering bearings. Notably, each rotor blade may include a root end that comprises a twisted shape designed to match the twist axis of a particular pitched yoke arm. This particular configuration may allow for the use of rotor blades with simplified contours and geometries, potentially reducing manufacturing complexity and costs.

The disclosed teetering rotor assembly with pitched yoke arms of embodiments may offer several advantages over conventional designs. For example, the teetering rotor assembly with pitched yoke arms may enable the attachment of moderately to highly twisted rotor blades without requiring an untwisted root section, simplifying blade geometry and potentially improving aerodynamic performance. These features may be particularly beneficial for rotor applications optimized for hover performance where bi-directional thrust may not be required.

In some embodiments, a method of manufacturing and/or assembling a teetering rotor assembly with pitched arms is provided. The method includes providing a rotor yoke with a hub portion and pitched yoke arms, aligning the pitched yoke arms with a precone axis elevated at a precone angle, twisting the pitched yoke arms at a twist angle relative to the plane of rotation, including feathering bearings into the pitched yoke arms, and coupling the rotor blades to the pitched yoke arms via the feathering bearings.

In some embodiments, manufacturing and/or assembling the teetering rotor assembly may include providing one or more rotor blades configured to be compatible with the pitched yoke arms of the rotor yoke and their specific geometry. In particular, the specific geometry may include factors such as the twist and precone angles of the yoke arms.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
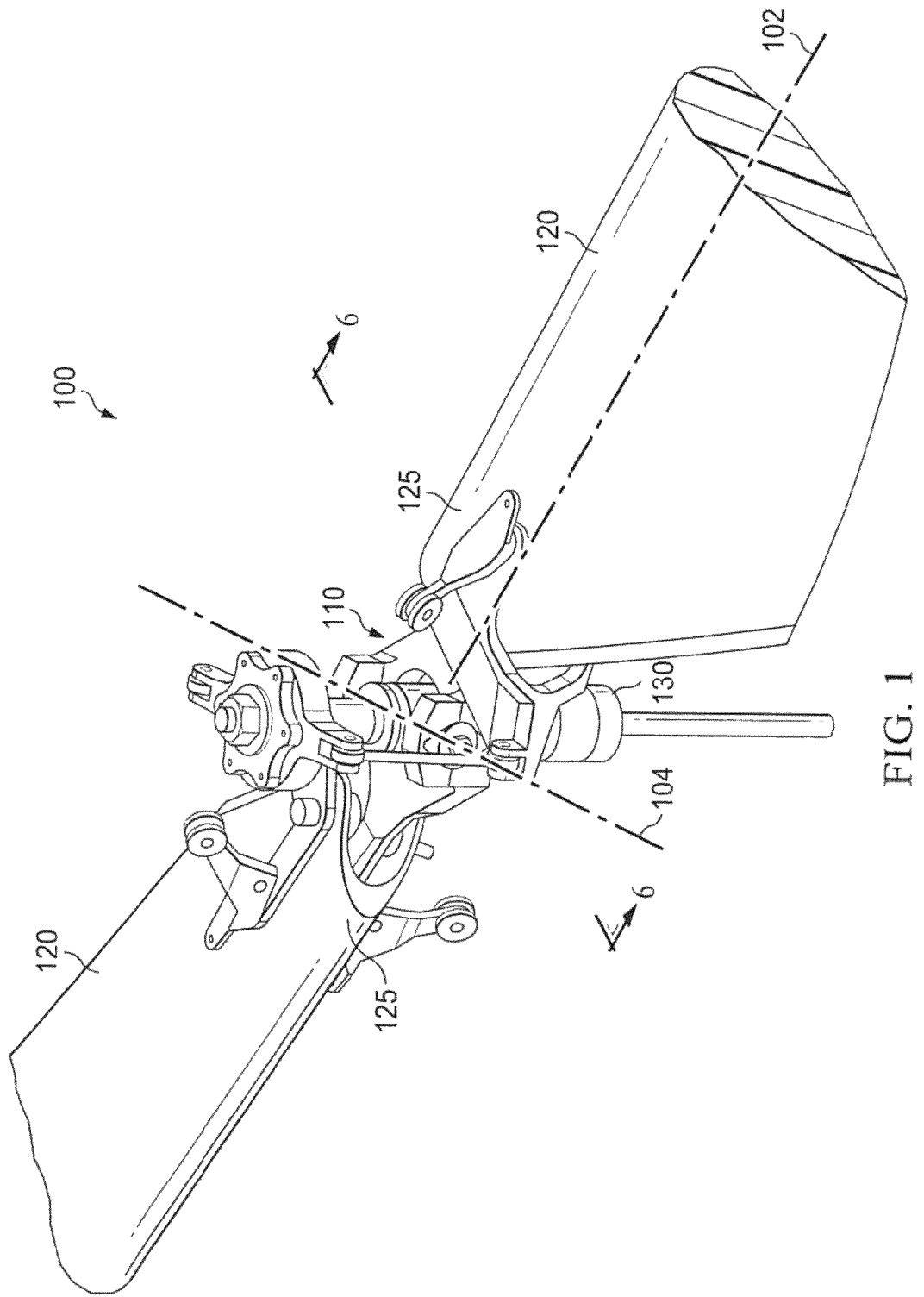
FIG. 1 illustrates an example of a teetering rotor assembly with pitched arms implemented in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

It is noted that helicopters and other aerial vehicles utilize one or more rotor assemblies for lift and propulsion. Rotor assemblies usually consist of multiple individual blades that are each connected to a central yoke that is coupled to a motor shaft. For example, a typical rotor assembly may consist of two individual blades that are each connected to a yoke with bolts. Many blades are manufactured to have complex shapes, twists, and curves in order to improve their efficiency and operation. In order to couple twisted blades to a typical yoke, the blade root (i.e., the portion of the blade that connects to the yoke) typically has an untwisted shape. This results in even more complex shapes and geometries for blades since a large portion of the blade is twisted while the blade root remains untwisted. This increase in complexity of blade shapes results in increased manufacturing costs and reduced blade lifetimes.

To address these and other problems associated with typical rotor assemblies, the enclosed embodiments provide a teetering rotor assembly having a rotor yoke with pitched yoke arms. In general, the disclosed embodiments provide a novel and unique rotor yoke that is unlike typical rotor yokes used for aircraft such as helicopters. Typically, rotor yokes are manufactured to include flat arms (e.g., arms that are not pitched or twisted but rather are in-plane with the plane of rotation of the rotor assembly). Rotor yokes with flat yoke arms require blades to be untwisted at their blade root ends in order to be coupled to the flat arms of the rotor yoke. This increases the complexity of the blade's geometry, manufacturing time, and cost of the rotor blades. The teetering rotor assembly of disclosed embodiments, however, may include a rotor yoke having yoke arms that are pitched or twisted in reference to the plane of rotation of the rotor assembly. By having a rotor yoke with pitched yoke arms, the teetering rotor assembly does not require the rotor blades to have untwisted root ends. Instead, the rotor blades may be manufactured with twisted root ends, which may enable a reduction in the complexity of the rotor blade's geometry, manufacturing time, and cost of the rotor blades.

FIG. 1 illustrates a teetering rotor assembly 100 implemented in accordance with embodiments of the present disclosure. As shown in FIG. 1, teetering rotor assembly 100 may be configured for use in rotary-wing aircraft, such as helicopters, tiltrotor aircraft, etc. In embodiments, teetering rotor assembly 100 may include rotor yoke 110, which may operate as the central hub for the teetering rotor assembly 100. Rotor yoke 110 may be securely attached to a shaft 130 during operation, allowing the entire teetering rotor assembly 100 to rotate and generate lift.

In embodiments, extending outward from the rotor yoke 110 may be a plurality of rotor blades 120. In embodiments, rotor blades 120 may be configured to operate as the primary lifting surfaces of the aircraft, and may be configured to create the necessary aerodynamic forces for flight. In embodiments, each rotor blade 120 may be configured with a specific airfoil shape, twist, and/or taper geometry to optimize its performance across various flight conditions. As shown in FIG. 1, each of rotor blades 120 may be attached to the rotor yoke 110 at a corresponding blade root end 125. The blade root end 125 of each of rotor blades 120 may operate as the critical interface point in teetering rotor assembly 100.

In embodiments, teetering rotor assembly 100 may be configured to teeter about teetering axis 104. This teetering motion may allow teetering rotor assembly 100 to adapt to various aerodynamic conditions and reduce stress on the aircraft structure. Teetering axis 104 may run perpendicular to rotor blades 120 and through the center of rotor yoke 110.

In embodiments, rotor blades 120 may be configured to feather about a feathering axis 102. This feathering functionality may enable rotor blades 120 to rotate around their longitudinal axis, changing their angle of attack. This feathering functionality may enable controlling of the lift generated by each of rotor blades 120 and for overall aircraft control.

While the specific embodiment illustrated in FIG. 1 may show a particular configuration of teetering rotor assembly 100, it should be appreciated that the configuration of teetering rotor assembly 100 may be flexible and adaptable. Indeed, other embodiments of the teetering rotor assembly 100 may include different numbers of rotor blades 120. For example, some configurations might utilize four rotor blades 120 instead of two, which may offer advantages in terms of vibration reduction or lift distribution.

Furthermore, the specific configuration of rotor yoke 110 illustrated in FIG. 1 is not intended to be limiting in any way, such as limited to a single rotor yoke 110. Indeed, in some embodiments, multiple rotor yokes 110 may be used. For example, in a particular implementation, two rotor yokes 110 stacked orthogonally to each other may be used. This particular configuration may potentially be used in compound helicopters or other rotorcraft configurations that may require multiple rotor systems.

It is noted that the functionality of teetering rotor assembly 100 to vary the number of rotor blades 120 and rotor yokes 110 may allow for the optimization of a rotor system for specific aircraft requirements, mission profiles, and/or performance characteristics. This adaptability of the teetering rotor assembly of embodiments represents an advantage of teetering rotor assembly 100, enabling its use across a wide range of applications.

In some embodiments, as also shown in FIG. 1, rotor yoke 110 of teetering rotor assembly 100 may include two or more yoke arms (e.g., pitched yoke arms 220) that are pitched or twisted relative to the plane of rotation of teetering rotor assembly 100. As mentioned herein, the twisted configuration of the yoke arms may offer several advantages over conventional rotor yoke designs with flat, untwisted arms. For example, the pitched or twisted yoke arms may allow for a more seamless integration with twisted rotor blades 120. In some embodiments, this pitched yoke arm configuration may eliminate the need for rotor blades 120 to have untwisted blade root ends 125. Instead, rotor blades 120 may be manufactured with twisted root ends 125 that match the pitch or twist of the yoke arms. This may simplify the overall geometry of the rotor blades 120, which may reduce their complexity and may streamline their manufacturing process.

In embodiments, by enabling the use of rotor blades 120 with consistently twisted geometries from root to tip, the pitched yoke arm configuration may offer several benefits. For example, the elimination of the transition from an untwisted root to a twisted blade body may result in a more uniform and potentially simpler blade design, which may simplify the manufacturing process of rotor blades 120. Another benefit is that a more consistent blade geometry may reduce the need for complex tooling or intricate layup procedures, particularly in the case of composite blades. Additionally, a continuous twist from root to tip for a rotor blade may allow for more optimal aerodynamic design, potentially improving the rotor blade's efficiency and performance. Furthermore, eliminating the transition between untwisted and twisted sections may reduce stress concentrations, potentially enhancing a rotor blade's durability. These simplified manufacturing processes and potentially improved durability may contribute to overall cost reductions in blade production and maintenance. Further still, a more uniform blade design may allow for better weight distribution and potentially lighter blade construction, optimizing the overall weight of the teetering rotor assembly 100.

Figure 2:
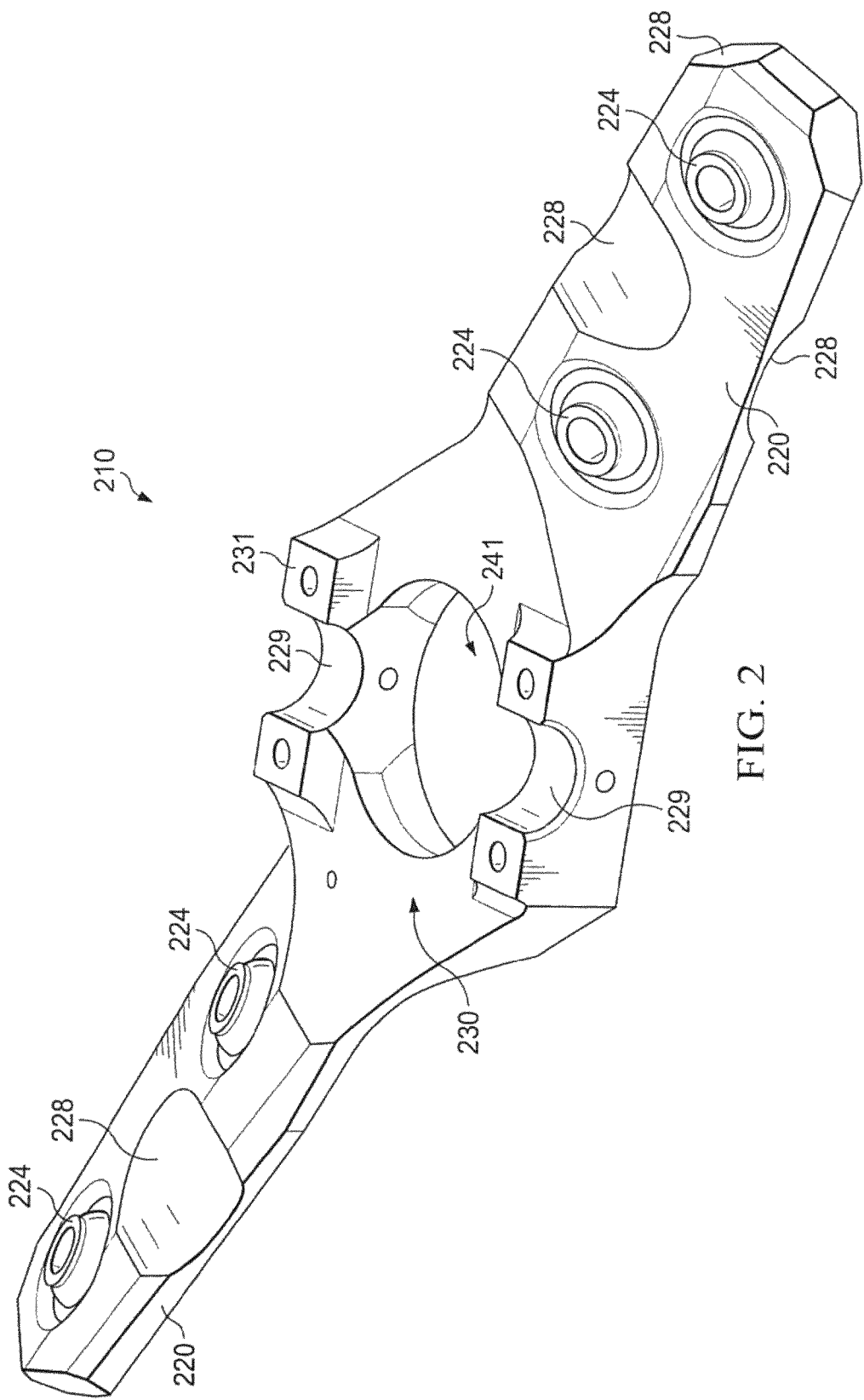
FIG. 2 is an isometric view of a rotor yoke with pitched arms that may be used in the teetering rotor assembly of FIG. 1 implemented in accordance with embodiments of the present disclosure.
Figure 3:
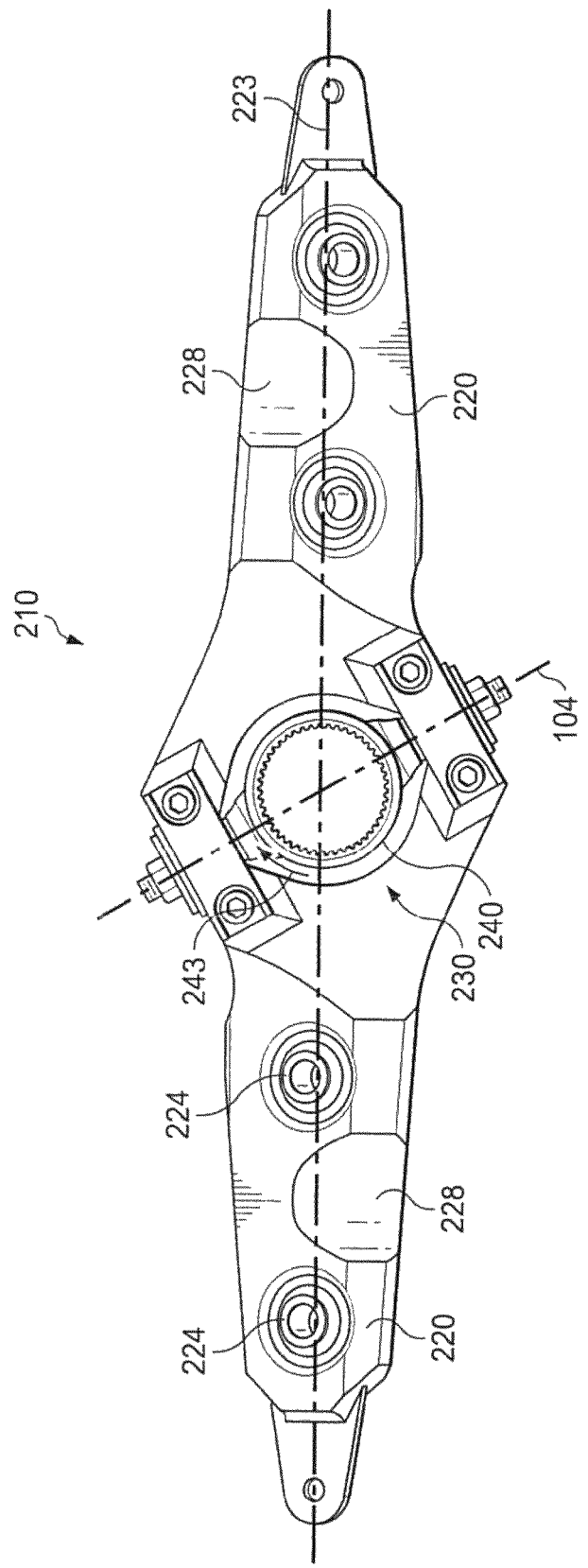
FIG. 3 is a top view of the rotor yoke with pitched arms of FIG. 2 implemented in accordance with embodiments of the present disclosure.
Figure 4:
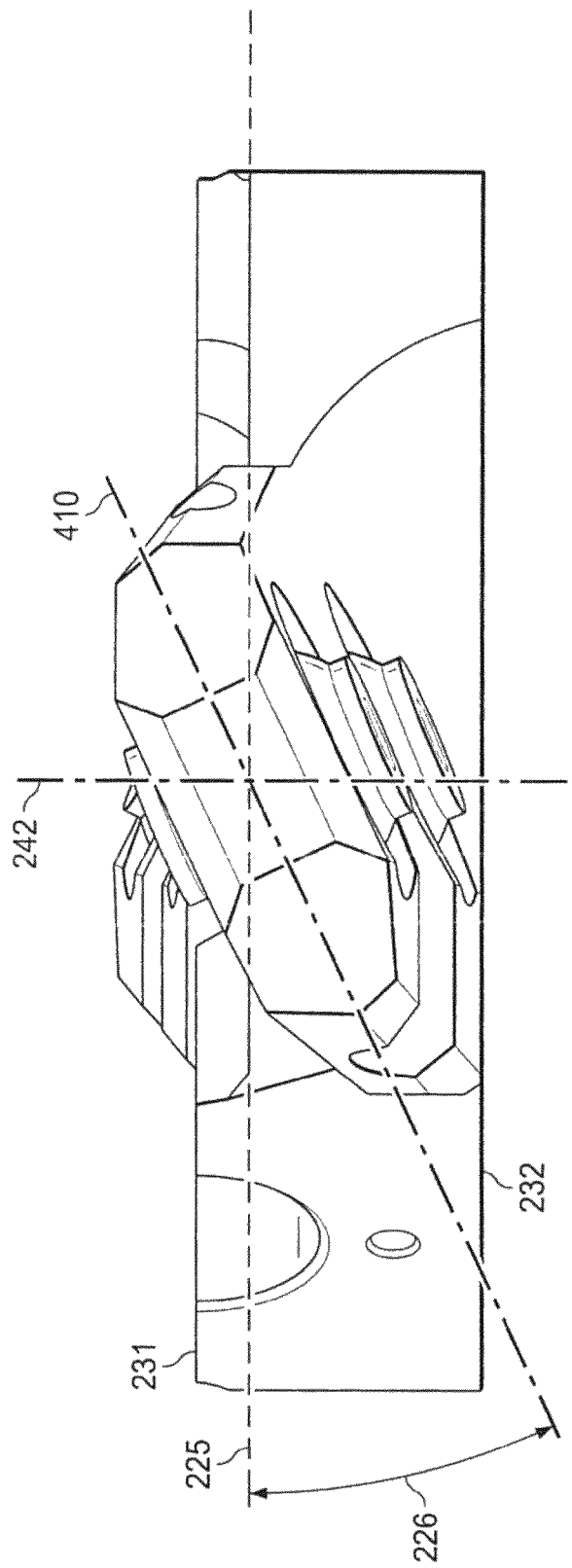
FIG. 4 is an end view of the rotor yoke with pitched arms of FIG. 2 implemented in accordance with embodiments of the present disclosure.
Figure 5:
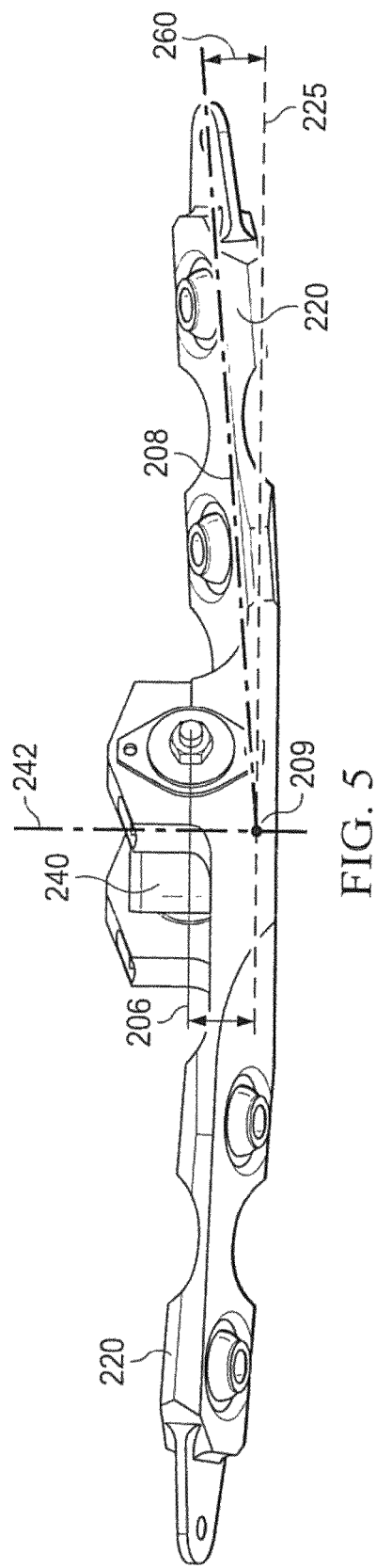
FIG. 5 is a side view of the rotor yoke with pitched arms of FIG. 2 implemented in accordance with embodiments of the present disclosure.

Specific embodiments of rotor yoke 110 are described in more detail below in reference to FIGS. 2-5. FIGS. 2-5 illustrate rotor yoke 210 that may be utilized as rotor yoke 110 of teetering rotor assembly 100. FIG. 2 is an isometric view of rotor yoke 210, according to certain embodiments; FIG. 3 is a top view of rotor yoke 210, according to certain embodiments; FIG. 4 is an end view of rotor yoke 210, according to certain embodiments; and FIG. 5 is a side view of rotor yoke 210, according to certain embodiments. Rotor yoke 210 will now be described in reference to FIGS. 2-5, collectively.

In embodiments, rotor yoke 210 may include a hub portion 230, which may operate as the central structural element of rotor yoke 210. In embodiments, hub portion 230 may be configured to enable secure coupling between rotor yoke 210 and shaft 130, which may facilitate the transfer of rotational energy from the aircraft's power system to the rotor assembly (e.g., teetering rotor assembly 100).

In some embodiments, hub portion 230 may incorporate or implement various features to enhance functionality and structural integrity. For example, hub portion 230 may include a shaft aperture 241, which may include an opening configured to interface with other components of the rotor system. In some embodiments, shaft aperture 241 may be generally cylindrical in shape, although other geometries may be employed depending on specific design requirements. The dimensions and tolerances of shaft aperture 241 may be configured to ensure proper fit and alignment with mating components. For example, in some embodiments, shaft aperture 241 may be sized and shaped to accommodate a trunnion 240, as illustrated in FIG. 3. The trunnion 240 may operate as a component in the teetering mechanism of the rotor assembly, allowing for the necessary range of motion while maintaining structural integrity. The interface between shaft aperture 241 and trunnion 240 may be configured to minimize wear and ensure smooth operation over extended periods of use.

In embodiments, hub portion 230 may include top and bottom surfaces, such as top side 231 and bottom side 232, respectively. In some embodiments, both top side 231 and bottom side 232 may be configured with flat profiles and may be coplanar with the plane of rotation 225 of rotor yoke 210. This flat configuration of top side 231 and bottom side 232 may provide several benefits, such as simplified manufacturing, improved stress distribution, and easier integration with other rotor system components.

In embodiments, the flat configuration of top side 231 and bottom side 232 may be configured to facilitate the attachment of additional components or instrumentation to hub portion 230. For example, the surfaces of top side 231 and bottom side 232 may include mounting points, threaded inserts, and/or other features configured to allow for the secure attachment of sensors, balance weights, and/or other auxiliary equipment that may be required for optimal rotor performance and/or monitoring.

In some embodiments, the overall geometry and construction of hub portion 230 may be optimized to balance multiple factors, including weight, strength, and manufacturability. For example, in some embodiments, hub portion 230 may be fabricated of constructed from high-strength materials such as aerospace-grade aluminum alloys, titanium, or advanced composites, depending on the specific requirements of the aircraft and its intended operational envelope.

In some embodiments, hub portion 230 may include features to enhance durability and resistance to environmental factors. For example, the surfaces of hub portion 230 (e.g., the surfaces of top side 231 and bottom side 232) may be treated with protective coatings or finishes to prevent corrosion, reduce wear, and/or improve resistance to ultraviolet radiation and other environmental stressors encountered during aircraft operation. In some embodiments, the transition zone or area between hub portion 230 and pitched yoke arms 220 (e.g., the area, point, or zone at which pitched yoke arms 220 are coupled to hub portion 230) may be configured to minimize stress concentrations and optimize load distribution. For example, this transition zone may incorporate fillets, tapers, and/or other geometric features to ensure a smooth load path and reduce the risk of fatigue cracking or other structural issues over the life of rotor yoke 210.

In embodiments, hub portion 230 may include a plurality of teetering hinge cutouts 229. For example, as illustrated in FIG. 2, hub portion 230 may include two teetering hinge cutouts 229. Teetering hinge cutouts 229 may be configured to enable the teetering motion of rotor yoke 110, which may be essential for the rotor assembly's operation and performance. For example, teetering hinge cutouts 229 may be configured with a semi-cylindrical shape, which in some embodiments may resemble half or less than half of a cylinder. This geometry of teetering hinge cutouts 229 may be configured to optimize the interface between the rotor yoke 210 and a teetering hinge assembly (e.g., trunnion 240), while optimizing other characteristics of the system such as stress distribution, weight reduction, and manufacturability. The semi-cylindrical shape of the teetering hinge cutouts 229 may allow for a smooth, low-friction surface that facilitates the teetering motion of the teetering rotor assembly.

In some embodiments, the teetering hinge cutouts 229 may be formed as material cutouts within the top side 231 of the hub portion 230. This configuration may provide several benefits, such as reducing the overall weight of the rotor yoke 210 while also maintaining its structural integrity. The placement of teetering hinge cutouts 229 on the top side 231 may also allow for easier access during assembly, maintenance, or inspection procedures.

In embodiments, teetering hinge cutouts 229 may be configured to permit coupling of the rotor yoke 210 to a teetering hinge assembly, which may include components such as the trunnion 240 illustrated in FIGS. 2 and 5. This coupling of the rotor yoke 210 to a teetering hinge assembly may enable the teetering motion of the teetering rotor assembly, allowing teetering rotor assembly 100 to adapt to varying conditions and reduce stress on the aircraft structure.

In some embodiments, teetering hinge cutouts 229 may be aligned along teetering axis 104. As illustrated in FIG. 3, teetering axis 104 may be offset from the yoke arm centerline 223 by a specific teetering angle 243. Teetering angle 243 and the offset between yoke arm centerline 223 and teetering axis 104 may operate to serve several purposes, such as improving the stability of the rotor system, optimizing its aerodynamic performance, and/or enhancing its handling characteristics. In embodiments, teetering angle 243 may vary depending on the specific design and/or operational requirements of the aircraft. In some embodiments, for example, teetering angle 243 may range between 50 and 90 degrees. A specific example may include a teetering angle 243 of approximately 60 degrees, though other angles within or even outside this range may be used depending on the particular application and performance goals.

As shown in FIG. 5, teetering axis 104 may be positioned at an undersling distance 206 from precone apex 209. Precone apex 209 may include the point where precone axis 208 intersects the plane of rotation 225 of rotor yoke 210. The inclusion of undersling distance 206 may operate to improve the stability of the rotor system, reducing vibration, or optimizing the load distribution across the rotor assembly. In embodiments, the value of the undersling distance 206 may vary depending on the size and design of the rotor system. In some embodiments, the value of undersling distance 206 may be between one and two inches. For example, an undersling distance 206 of approximately 1.3 inches may be used in certain configurations, though other distances within or outside this range may be employed based on the specific requirements of the aircraft and its intended operational profile.

In embodiments, rotor yoke 210 may include a plurality of pitched yoke arms 220, each pitched yoke arm 220 aligned along a yoke arm centerline 223. In embodiments, the number of pitched yoke arms 220 that may be included in rotor yoke 210 may vary depending on the specific design requirements and intended application of the rotor system. In some embodiments, rotor yoke 210 may include two pitched yoke arms 220 as illustrated in FIGS. 1-5. This illustrated configuration may be particularly suitable for certain types of helicopters or other rotorcraft that utilize a two-bladed rotor system. In some embodiments, rotor yoke 210 may include more than two pitched yoke arms 220. For example, for some configurations, rotor yoke 210 may include four pitched yoke arms 220, which may offer advantages in terms of load distribution, stability, and/or aerodynamic performance. In embodiments, the configuration related to the number of pitched yoke arms 220 may be based on factors such as the aircraft's size, weight, mission profile, and/or desired performance characteristics.

In embodiments, each pitched yoke arm 220 may be coupled to hub portion 230, and may be part of the rotor yoke 210 structure. The type or mechanism used to couple pitched yoke arms 220 and hub portion 230 together may depend on the manufacturing process and materials used. In some embodiments, pitched yoke arms 220 and hub portion 230 may be formed as a single, monolithic component where pitched yoke arms 220 and hub portion 230 are a unitary body. In embodiments, pitched yoke arms 220 and hub portion 230 may be formed as a unitary component by machining the entire 3D shape of rotor yoke 210 out of a single piece of material such as metal, and/or through processes such as forging, casting, and/or advanced machining techniques. In some embodiments, the manufacturing process for a unitary unit rotor yoke 210 may include machining techniques, such as computer numerical control (CNC) milling or electrical discharge machining (EDM). These processes may allow for precise shaping of complex geometries, including the intricate features of the pitched yoke arms 220 and hub portion 230. In some embodiments, the manufacturing process may begin with a solid block of material, such as high-strength aluminum alloy, titanium, or steel, which is then carefully machined to achieve the final form of the rotor yoke 210. This unitary configuration for rotor yoke 210 may offer benefits in terms of structural integrity and weight reduction.

In alternative or additional embodiments, pitched yoke arms 220 may be manufactured separately from hub portion 230 and subsequently coupled during the assembly process. This modular configuration may offer advantages, such as allowing for greater flexibility in material selection, potentially enabling the use of different materials for the hub portion 230 and pitched yoke arms 220 to optimize specific properties in each component, facilitating easier maintenance or replacement of individual components if needed, etc. In embodiments, coupling the separately manufactured pitched yoke arms 220 to hub portion 230 may include using mechanical fasteners such as bolts, rivets, screws, etc., welding, bonding, using adhesives, etc., and/or any combination thereof.

In embodiments, the alignment of each pitched yoke arm 220 along yoke arm centerline 223 is of a very high importance. This alignment may help ensure proper load distribution and balance during operation. Yoke arm centerline 223 may be defined and controlled during the manufacturing process to maintain tight tolerances and ensure consistency across all pitched yoke arms 220.

In some embodiments, pitched yoke arms 220 may include a degree of flexibility or elasticity. This flexibility may allow pitched yoke arms 220 to deflect slightly under load and may help reduce stress concentrations and improve the overall durability of the rotor yoke 210. The specific stiffness properties of the pitched yoke arms 220 may be configured to achieve the desired balance between flexibility and structural integrity and will be described in more detail below.

In some embodiments, pitched yoke arms 220 may be configured to accommodate control systems, such as pitch links, hydraulic actuators, etc. These features may be included into the configuration of pitched yoke arms 220 to facilitate the control of rotor blade pitch during flight operations. In embodiments, pitched yoke arms 220 may be manufactured using high-strength, lightweight materials such as titanium alloys, advanced composites, and/or specialized steel alloys to achieve a balanced combination of strength, stiffness, and weight characteristics. The materials used for pitched yoke arms 220 may also be based on factors such as fatigue resistance, corrosion resistance, manufacturability, etc.

In embodiments, each pitched yoke arm 220 may include one or more feathering bearings 224 that are used to couple rotor blades 120 to rotor yoke 210. The number and configuration of feathering bearings 224 may vary depending on the specific operational and performance requirements for the rotor system. For example, the illustrated embodiments of rotor yoke 210 in FIGS. 2-5 include two feathering bearings 224 per pitched yoke arm 220, but other configurations may utilize a single bearing or more than two bearings per arm.

In embodiments, feathering bearings 224 may be configured to enable each rotor blade 120 to feather about feathering axis 102 while concurrently securing the rotor blade 120 in a chordwise direction. This multi-functionality of feathering bearings 224 may allow for precise control of blade pitch during flight operations while maintaining the structural integrity of the rotor system.

In some embodiments, feathering bearings 224 may be disposed partially or fully within pitched yoke arms 220, which may reduce aerodynamic drag, and may improve structural efficiency protection of the bearing components from environmental factors. The specific positioning of feathering bearings 224 within pitched yoke arms 220 may be based on factors such as load distribution, manufacturing considerations, maintenance accessibility, etc.

In embodiments, feathering bearings 224 may be positioned at various locations along yoke arm centerline 223. The specific positioning of feathering bearings 224 may be based on a desired dynamic behavior of the rotor blades, and may be based on factors such as blade natural frequencies, stress distribution, overall rotor performance, etc. For example, a first feathering bearing 224 may be placed along yoke arm centerline 223 with a center that is 6.5 inches from shaft axis of rotation 242, while a second feathering bearing 224 may be placed with a center that is 12.0 inches from shaft axis of rotation 242. These dimensions may be adjusted based on specific design requirements and rotor blade characteristics, and should not be construed as limiting in any way. Indeed, other distances may be used in some configurations.

Figure 6:
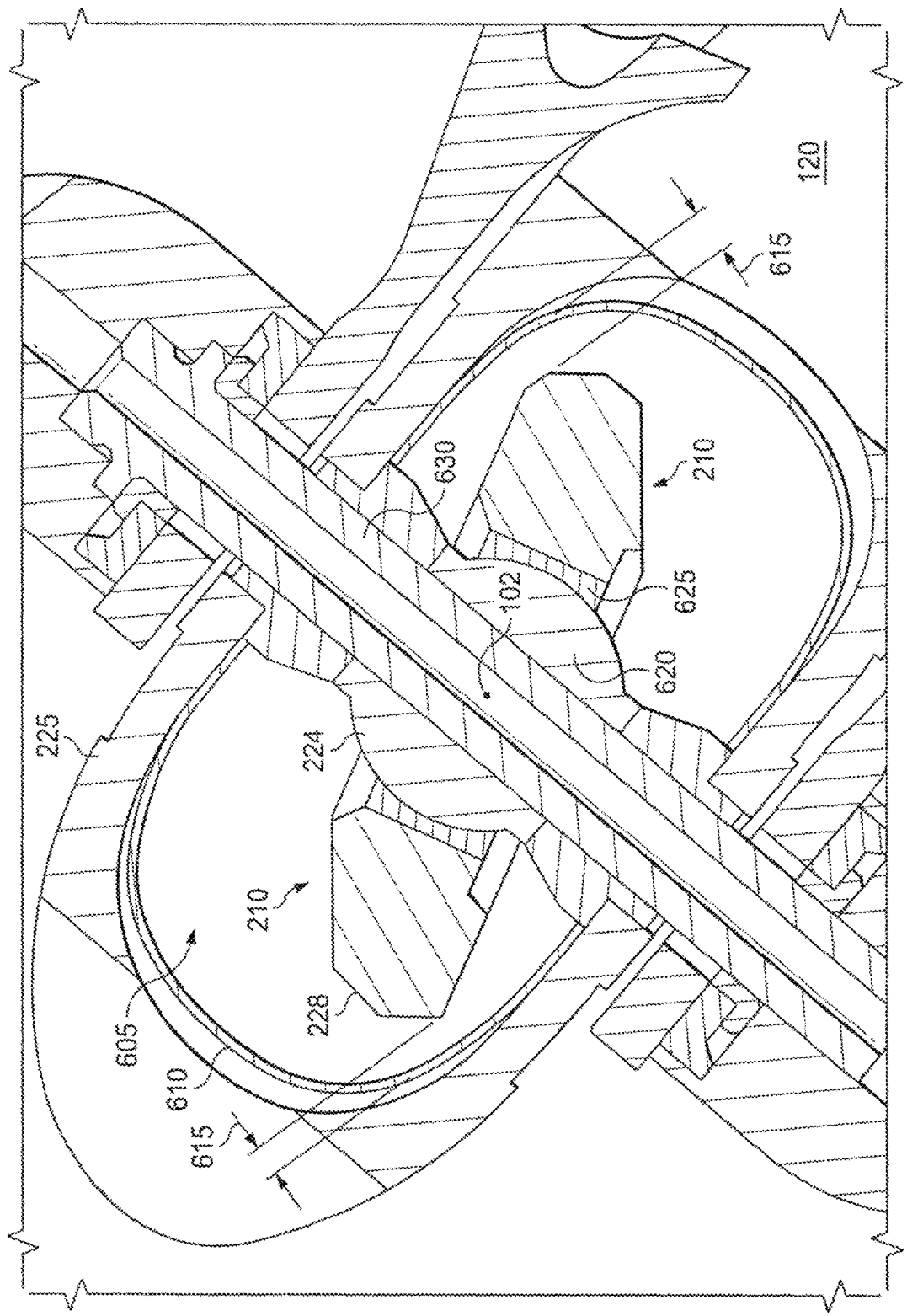
FIG. 6 is a cutaway view of the teetering rotor assembly with pitched arms of FIG. 1 implemented in accordance with embodiments of the present disclosure.

In some embodiments, each feathering bearing 224 may include a through-bore that allows an attachment member 630, such as illustrated in FIG. 6, to couple rotor blade 120 to rotor yoke 210. This configuration may facilitate secure attachment of the rotor blade while allowing for the necessary rotational movement about the feathering axis. As further illustrated in FIG. 6, feathering bearings 224 may include a spherical member 620 that is configured to rotate inside a race 625. This spherical design may be configured to compensate for some degree of misalignment or deflection during operation, and may help reduce stress on the feathering bearing assembly. In embodiments, the materials and surface treatments used for the spherical member 620 and race 625 may be configured to minimize friction, resist wear, and provide long-term reliability. In some embodiments, race 625 may be secured inside a housing that may be integral with pitched yoke arm 220.

As illustrated in FIG. 4, some embodiments of rotor yoke 210 may include pitched yoke arms 220 that are aligned laterally with a twist axis 410. Twist axis 410 may be twisted at a yoke arm twist angle 226 relative to plane of rotation 225. In some embodiments, for example, yoke arm twist angle 226 may be greater than zero degrees but less than 35 degrees. This range of twist angles may allow for optimal alignment with the natural twist of the rotor blades 120 while maintaining structural integrity and manufacturability of the rotor yoke 210. The specific configuration of yoke arm twist angle 226 may be on various factors such as the blade design, operational requirements, desired aerodynamic characteristics of the rotor system, etc.

In some embodiments, yoke arm twist angle 226 may be determined as a function of the blade root twist angle and the total blade pitch range. This approach may be used to create a symmetric misalignment of the feathering bearings at minimum and maximum blade pitch angles. By optimizing the yoke arm twist angle in this manner, the maximum misalignment angle required from the feathering bearing may be minimized, which may subsequently reduce the overall size and envelope of the feathering bearing.

In embodiments, an equation may be used to determine yoke arm twist angle 226. This equation may take into account the blade root twist angle as well as the maximum and minimum pitch angles of the rotor blade. For example, Equation 1 below may be used for determining yoke arm twist angle 226.

$$\theta_{yoke} = \theta_{Blade} + \frac{\theta_{Max\_Pitch} + \theta_{Min\_Pitch}}{2} \quad \text{(Equation 1)}$$

where $\theta_{yoke}$ is the yoke arm twist angle, $\theta_{Blade}$ is the blade root twist angle, $\theta_{Max\_Pitch}$ is the maximum pitch angle of the rotor blade, and $\theta_{Min\_Pitch}$ is the minimum pitch angle of the rotor blade.

To illustrate the application of Equation 1, we discuss a specific, non-limiting example where a rotor blade has a lade root twist of +20 degrees, a maximum pitch angle of +20 degrees, and a minimum pitch angle of −10 degrees. In this example, applying Equation 1, yoke arm twist angle 226 ($\omega_{yoke}$) may be obtained as follows:

$$\theta_{yoke} = 20 + \frac{20 - 10}{2} = 25\,Deg$$

Thus, in this example, the calculated yoke arm twist angle is 25 degrees. It is important to note that while Equation 1 may provide a good starting point for determining the yoke arm twist angle, other techniques, and methods may be used, and other factors may also influence the yoke arm twist angle determination. These factors may include specific aircraft requirements, aerodynamic considerations, structural limitations, manufacturing constraints, etc. Therefore, the calculated yoke arm twist angle may be further refined through additional analysis, simulation, and testing to ensure optimal performance of the entire rotor system.

In general, yoke arm twist angle 226 may be selected to facilitate attachment of rotor yoke 210 to rotor blades 120 such that blade root ends 125 of rotor blades 120 may remain untwisted. As mentioned elsewhere herein, this pitched yoke arm configuration of rotor yoke 210 may offer several benefits such as simpler blade root geometries, reduced manufacturing complexity and associated costs for the rotor blades 120, etc. Additionally, the untwisted blade root ends 125 may also provide improved structural properties at the critical blade-to-yoke interface. It is also noted that the twisted configuration of pitched yoke arms 220 may enable a more seamless transition between rotor yoke 210 and the twisted portion of the rotor blades 120. This smooth transition may help to minimize stress concentrations and improve the overall aerodynamic efficiency of the rotor system. In some embodiments, the twisted yoke arm configuration may also contribute to reduced vibration and noise during operation.

In embodiments, the configuration (e.g., the value selection or calculation) of yoke arm twist angle 226 may be based on a combination of analytical modeling, computational fluid dynamics simulations, physical testing, etc. The chosen yoke arm twist angle 226 may represent a balance between multiple considerations, including structural strength, weight, manufacturability, aerodynamic performance, etc. In general, yoke arm twist angle 226 may be selected to facilitate attachment of rotor yoke 210 to rotor blades 120 such that blade root ends 125 of rotor blades 120 may remain untwisted. In some embodiments, yoke arm twist angle 226 may vary along the length of the pitched yoke arm 220, which may allow for further optimization of the rotor system's performance characteristics. In some embodiments, yoke arm twist angle 226 may be selected to facilitate part clearance. For example, the aircraft mission profile may provide parameters that may be used to define and/or select yoke arm twist angle 226. The yoke arm twist angle 226 may be selected to allow a blade to rotate relative to the yoke arm without contacting the yoke arm while ensuring that there is sufficient clearance to allow for elastic deformation under load.

As illustrated best in FIG. 5, some embodiments of rotor yoke 210 may include pitched yoke arms 220 that are aligned longitudinally with a precone axis 208. This precone axis 208 may be elevated at a precone angle 260 relative to the plane of rotation 225. In some embodiments, for example, precone angle 260 may be between two and five degrees (e.g., 2.0 degrees, 3.75 degrees, 5.0 degrees). However, the precone angle 260 is not limited to this range and may include angles that are less than two degrees but greater than zero degrees, and/or angles that are greater than 5 degrees. The specific precone angle chosen may depend on various factors such as the rotor system size, operational requirements such as rotor rotational velocity, desired performance characteristics such as thrust, etc.

In embodiments, precone angle 260 may be selected to reduce steady bending stresses within pitched yoke arms 220 that are induced by typical operations. By incorporating precone angle 260, the rotor system may more effectively balance the centrifugal forces acting on the rotor blades during operation with the thrust generated by the rotor. This balancing of forces may help to counteract the bending moments experienced by pitched yoke arms 220, which may increase their operational lifespan. Furthermore, precone angle 260 may be selected to reduce out-of-plane shear loads on feathering bearings 224. For example, precone angle 260 may help to align the primary load paths more closely with the structural axes of the rotor system components. This alignment may result in reduced shear stresses on critical components such as the feathering bearings 224, which may enhance their durability and performance over time. In embodiments, precone angle 260 may optimize the loading characteristics of pitched yoke arms 220 in order to enable proper operation of teetering rotor assembly 100. For example, with an appropriately selected precone angle 260, a rotor system may be able to achieve a more favorable balance of forces.

It is noted that typically, tail rotor assemblies of aircraft such as helicopters do not include precone angle features such as precone angle 260. This is primarily because tail rotor assemblies are generally designed to create bi-directional thrust, allowing the aircraft to yaw in both directions. The absence of precone in traditional tail rotors is often due to the need for symmetric performance in both directions of rotation. However, in accordance with one or more embodiments of the present disclosure, teetering rotor assembly 100 may be selected for hover-only use cases. In these specialized applications, teetering rotor assembly 100 may not require the ability to produce bi-directional thrust. Instead, teetering rotor assembly 100 may be optimized for efficient and stable operation in a single direction, typically for vertical lift or hover capabilities. In these hover-only situations, including precone angle 260 may be advantageous for reducing steady stresses within pitched yoke arms 220. The precone configuration may allow for a more efficient transfer of lift forces from the rotor blades to the hub, reducing the bending moments experienced by pitched yoke arms 220.

In embodiments, selection of a value for precone angle 260 may be based on various factors. These factors may include the aerodynamic characteristics of the rotor blades 120, the overall weight distribution of the rotor system, the specific operational envelope of the aircraft, etc. In some embodiments, advanced modeling and simulation techniques may be used to optimize precone angle 260 for specific applications, taking into account factors such as rotor speed, blade geometry, expected flight conditions, etc. In some embodiments, precone angle 260 may be fixed, configured into the structure of rotor yoke 210. In some embodiments, adjustable precone mechanisms may be included that may allow for fine-tuning precone angle 260 based on specific operational requirements or flight conditions.

In a typical rotor yoke with flat yoke arms, the in-plane and out-of-plane stiffnesses of the flat yoke arms are generally considered separate and independent properties. This means that the response of the yoke arms to forces applied in the plane of rotation is distinct from their response to forces applied perpendicular to this plane. However, rotor yoke 210 includes a unique configuration in its pitched yoke arms 220 that alters this characteristic in that the in-plane and out-of-plane stiffnesses of pitched yoke arms 220 are coupled.

In embodiments, pitched yoke arms 220 of rotor yoke 210 include a coupling between their in-plane and out-of-plane stiffnesses. This coupling between the in-plane and out-of-plane stiffnesses of pitched yoke arms 220 indicates that forces applied in one direction can induce deformations or responses in multiple directions, creating a more complex and interconnected structural behavior. This coupled stiffness characteristic of pitched yoke arms 220 may provide several advantages.

For example, the coupled stiffness of pitched yoke arms 220 may allow for more efficient load distribution throughout the rotor system. When subjected to complex loading conditions during flight, the coupled stiffness of pitched yoke arms 220 may enable pitched yoke arms 220 to deform in ways that more effectively absorb and dissipate energy, which may reduce overall stress concentrations and improve fatigue life. Additionally, or alternatively, the coupling of in-plane and out-of-plane stiffnesses of pitched yoke arms 220 may contribute to enhanced aerodynamic performance. For example, by allowing for more complex deformation patterns, pitched yoke arms 220 may facilitate smoother transitions between different flight configurations.

In some embodiments, the coupled stiffness characteristics of pitched yoke arms 220 may be configured to achieve specific performance goals. For example, the degree of coupling may be optimized to enhance the natural frequency response of the rotor system, which may operate to improve its resistance to harmful resonance conditions.

In embodiments, analyzing and calculating the coupled stiffness properties of pitched yoke arms 220, such as the stiffness values and their interrelationships, may be done using equations such as Equation 2 as follows:

(Equation 2)

$$\text{Coupled Stiffness Matrix} \xrightarrow{\text{Diagonalize Using Eigenvalues and Eigenvectors of Matrix}}$$
$$K = \begin{bmatrix} K_{bb} & K_{bc} \\ K_{cb} & K_{cc} \end{bmatrix}$$

$$D = P^{-1}KP$$
$$D := \text{New Stiffness Matrix of Eigenvalues}$$
$$D = \begin{bmatrix} D_{bb} & 0 \\ 0 & D_{cc} \end{bmatrix}$$
$$P := \text{Rotation Matrix of Eigenvectors}$$
can find rotation ($\theta$) from $P$.

Equation 2 may provide a framework for representing the coupled stiffness matrix associated with a pitched yoke arm 220 and transforming it into a more manageable form for analysis. In particular, the stiffness matrix transformation shown in Equation 2 may allow users to diagonalize the coupled stiffness matrix, potentially simplifying certain aspects of the structural analysis. This diagonalization process may involve determining the eigenvalues and eigenvectors of the original stiffness matrix, which may provide insight into the principal stiffness directions and magnitudes of the pitched yoke arms 220.

The transformation may begin with a coupled stiffness matrix K, which may represent the stiffness properties of the pitched yoke arm 220 in its original coordinate system. This matrix may include off-diagonal terms that represent the coupling between in-plane and out-of-plane stiffnesses. To simplify the analysis, the coupled stiffness matrix K may be transformed into a diagonal matrix D through a process of diagonalization. This transformation may involve calculating the eigenvalues and eigenvectors of the original matrix K. The resulting diagonal matrix D may represent the stiffness properties of the pitched yoke arm 220 in a new coordinate system where the stiffnesses are decoupled. The rotation matrix P, composed of the eigenvectors of K, may define the transformation between the original and new coordinate systems. The rotation angle θ, which may be derived from the rotation matrix P, may provide information about the orientation of the principal stiffness axes relative to the original coordinate system of the pitched yoke arm 220.

This transformation process may enable the determination of principal stiffness values and their corresponding directions for pitched yoke arms 220. Analyzing the diagonal matrix D may provide insight into the maximum and minimum stiffness values of pitched yoke arm 220, which may occur along the principal axes defined by the eigenvectors. This process may enable more accurate modeling and analysis of the structural behavior of the pitched yoke arms 220, as it may provide a context for understanding how the geometry of pitched yoke arms 220 may affect their response to various loading conditions.

In some embodiments, rotor yoke 210 may include one or more cutouts 228. Cutouts 228 may be placed at various locations on rotor yoke 210 to optimize and/or configured various aspects of rotor yoke 210's characteristics. For example, the placement of cutouts 228 on rotor yoke 210 may allow for customization based on specific requirements. In general, cutouts 228 may be positioned at any suitable location on rotor yoke 210 to achieve desired configurations related to stiffness, weight reduction, and/or clearance considerations.

A main functionality of cutouts 228 may be to modify the stiffness characteristics of pitched yoke arms 220. By placing cutouts 228 on rotor yoke 210, the overall stiffness of pitched yoke arms 220 may be controlled. For example, cutouts 228 may be placed on rotor yoke 210 to decrease the stiffness of pitched yoke arms 220. This reduction in stiffness may allow pitched yoke arms 220 to exhibit increased flexibility, enabling pitched yoke arms 220 to bend or flex more readily in response to applied loads during operation.

The ability of pitched yoke arms 220 to flex under load may offer several potential benefits for teetering rotor assembly 100. For example, this increased flexibility may contribute to a reduction in vibrations transmitted through teetering rotor assembly 100. By allowing pitched yoke arms 220 to absorb and dissipate energy through controlled deformation, cutouts 228 may help to damp vibrations that would otherwise propagate through the aircraft structure. The enhanced flexibility provided by cutouts 228 may contribute to an increase in the overall lifespan of teetering rotor assembly 100. By allowing for more gradual and distributed stress distribution throughout pitched yoke arms 220, cutouts 228 may help to reduce peak stresses and minimize the risk of fatigue-related failures. This may result in improved durability and reliability of teetering rotor assembly 100 over extended periods of operation.

In embodiments, each pitched yoke arm 220 may include a particular number of cutouts 228. For example, as illustrated in the example embodiments of rotor yoke 210, each pitched yoke arm 220 may include two primary cutouts 228—one on a top side of pitched yoke arm 220 between feathering bearings 224, and one on a bottom side of pitched yoke arm 220 between feathering bearings 224. In addition to the cutouts 228 between feathering bearings 224, each pitched yoke arm 220 may also include one or more cutouts 228 at its ends, as illustrated in FIGS. 2 and 3.

It should be noted that the number and configuration of cutouts 228 are not limited to the examples provided. In embodiments, rotor yoke 210 may include any number of cutouts 228, placed at any appropriate location, even if not described explicitly herein, may be used in order to optimize stiffness, weight, or clearance considerations for rotor yoke 210. The specific number, size, shape, and placement of cutouts 228 may be determined based on specific operational and/or design requirements.

FIG. 6 is a cutaway view of teetering rotor assembly 100 as indicated by the cutaway lines shown in FIG. 1, according to certain embodiments. FIG. 6 illustrates details and clearances surrounding the interface of feathering bearings 224 of rotor yoke 210 with rotor blades 120. As illustrated in FIG. 6, each blade root end 125 of each rotor blade 120 includes a blade root opening 605. In general, blade root opening 605 permits one of the pitched yoke arms 220 of rotor yoke 210 to be inserted into the untwisted blade root end 125 of rotor blade 120. As previously described, each feathering bearing 224 includes a through-bore that permits attachment member 630 to attach rotor blade 120 to pitched yoke arm 220. As illustrated, attachment member 630 passes through one side of blade root end 125 of rotor blade 120, through the bore within sphere 620 of feathering bearing 224, and through the other side of blade root end 125 of rotor blades 120.

As illustrated in FIG. 6, rotor blades 120 each include an inner mold line (IML) surface 610. As rotor blade 120 rotates about feathering axis 102, rotor yoke 210 remains stationary while sphere 620 rotates in race 625. The feathering action of rotor blade 120 changes (e.g., reduces or increases) clearances 615 between pitched yoke arms 220 and IML surface 610. In some embodiments, rotor yoke 210 is designed with dimensions and features to allow for balancing clearances 615 between IML surface 610 and pitched yoke arms 220 at the extremes of the blade pitch range of rotor blades 120. For example, yoke arm twist angle 226 may be selected to optimize clearances 615 between pitched yoke arms 220 and IML surface 610. For example, the yoke arm twist angle 226 may be selected to provide adequate clearance at both the minimum and maximum blade pitch angles. Additionally, the shape and profile of pitched yoke arms 220 may be configured to maintain consistent clearances throughout the rotor blade's range of motion. Furthermore, yoke arm twist angle 226 may be selected to minimize the misalignment angle required of feathering bearings 224, thereby reducing the size of feathering bearings 224, the yoke arm envelope, and overall weight of rotor yoke 210.

Figure 7:
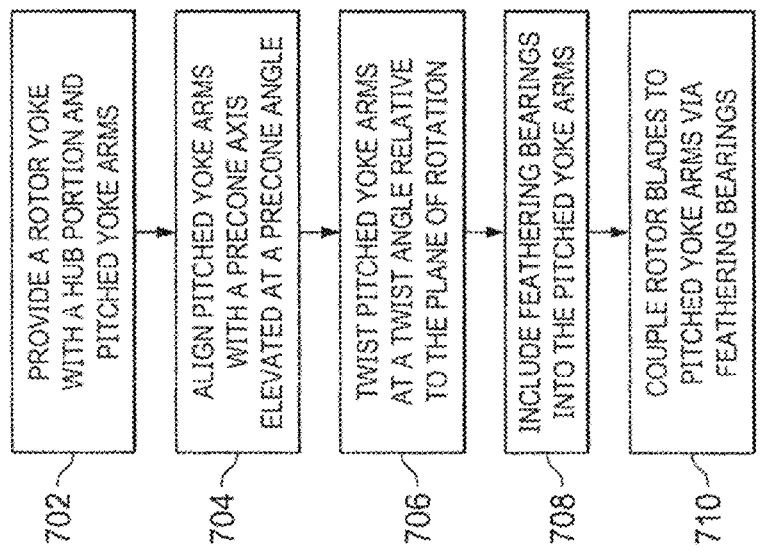
FIG. 7 shows an exemplary flow diagram of operations for manufacturing a teetering rotor assembly with pitched arms in accordance with embodiments of the present disclosure.

FIG. 7 shows an exemplary flow diagram of operations for manufacturing and/or assembling a teetering rotor assembly with pitched arms configured with functionality in accordance with aspects of the present disclosure. For example, the steps illustrated in the example blocks shown in FIG. 7 may be performed to manufacture and/or assemble teetering rotor assembly 100 of FIGS. 1-6, according to embodiments herein.

At block 702, a rotor yoke with a hub portion and pitched yoke arms is provided. In embodiments, the rotor yoke may be manufactured as a single unit or assembled from separate components, in accordance with the disclosure herein. For example, a rotor yoke (e.g., rotor yoke 110 illustrated in FIG. 1 or rotor yoke 210 as illustrated in FIGS. 2-5) with a hub portion (e.g., hub portion 230 as illustrated in FIGS. 2-5) and pitched yoke arms (e.g., pitched yoke arms 220 as illustrated in FIGS. 2-5) may be provided.

At block 704, a precone alignment may be performed. In embodiments, the precone alignment may include aligning the pitched yoke arms of the rotor yoke with a precone axis elevated at a precone angle (e.g., precone angle 260 as illustrated in FIG. 5) relative to a plane of rotation (e.g., plane of rotation 225 as illustrated in FIG. 5). The precone angle may be selected based on various factors such as desired load distribution and aerodynamic performance.

At block 706, a twist angle adjustment may be performed. In embodiments, the twist angle adjustment may include twisting the pitched yoke arms of the rotor yoke at a specific twist angle (e.g., yoke arm twist angle 226 as illustrated in FIG. 4) relative to the plane of rotation (e.g., plane of rotation 225 as illustrated in FIG. 4). The twist angle may be selected based on various factors such as optimizing clearances between the pitched yoke arms and rotor blade surfaces, minimizing stress concentrations, and improving overall aerodynamic efficiency.

At block 708, feathering bearing may be included into the pitched yoke arms. For example, one or more feathering bearings (e.g., feathering bearings 224 as illustrated in FIGS. 2 and 3) may be included into the pitched yoke arms (e.g., pitched yoke arms 220 as illustrated in FIGS. 2-5). In embodiments, the feathering bearings may be disposed at various locations along the yoke arm centerline of the pitched yoke arms. The specific positioning of the feathering bearings may be based on a desired dynamic behavior of the rotor blades, and may be based on factors such as blade natural frequencies, stress distribution, overall rotor performance, etc.

At block 710, rotor blades are coupled to the pitched yoke arms via the feathering bearings. For example, rotor blades (e.g., rotor blades 125 as illustrated in FIG. 1) may be coupled to the pitched yoke arms (e.g., pitched yoke arms 220 as illustrated in FIGS. 2-5) using the one or more feathering bearings (e.g., feathering bearings 224 as illustrated in FIGS. 2 and 3). In embodiments, the rotor blade coupling step may be facilitated by the use of alignment pins or fixtures to ensure proper positioning of the rotor blades relative to the pitched yoke arms. The rotor blades may be securely fastened to the pitched yoke arms using high-strength bolts, lock nuts, or other fastening mechanisms designed to withstand the extreme forces and vibrations experienced during rotor operation, using specialized adhesives or sealants to enhance the structural integrity of the connection and prevent moisture ingress, using a welding process, and/or any combination thereof.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112(*f*) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A teetering rotor assembly comprising:
   a rotor yoke comprising:
      a hub portion comprising a shaft aperture and two teetering hinge cutouts; and
      a plurality of pitched yoke arms, each pitched yoke arm coupled to the hub portion and comprising one or more feathering bearings, wherein:
         each pitched yoke arm comprises a precone axis that is elevated at a precone angle relative to a plane of rotation of the rotor yoke; and
         each pitched yoke arm comprises a twist axis that is twisted at a twist angle relative to the plane of rotation of the rotor yoke;
   a plurality of rotor blades configured to couple to the plurality of pitched yoke arms of the rotor yoke via the feathering bearings, each rotor blade comprising a root end that comprises a twisted shape to match the twist axis of a particular one of the pitched yoke arms.

2. The teetering rotor assembly of claim 1, wherein the precone angle is between two and five degrees.

3. The teetering rotor assembly of claim 1, wherein the twist angle is between fifteen and thirty-five degrees.

4. The teetering rotor assembly of claim 1, wherein:
each pitched yoke arm is aligned along a yoke arm centerline of the rotor yoke; and
the two teetering hinge cutouts are aligned along a teetering axis that is offset at a teetering angle to the yoke arm centerline of the rotor yoke.

5. The teetering rotor assembly of claim 4, wherein the teetering angle is between fifty and ninety degrees.

6. The teetering rotor assembly of claim 1, wherein:
the plurality of pitched yoke arms is two pitched yoke arms; and
each pitched yoke arm comprises two feathering bearings.

7. The teetering rotor assembly of claim 1, wherein the plurality of pitched yoke arms and the hub portion are formed as a single unit.

8. The teetering rotor assembly of claim 1, wherein an in-plane stiffness and an out-of-plane stiffness of each particular pitched yoke arm are coupled.

9. The teetering rotor assembly of claim 1, wherein each particular pitched yoke arm comprises one or more cutouts configured to decrease a stiffness of the particular pitched yoke arm, thereby allowing the particular pitched yoke arm to bend or flex in response to loads.

10. The teetering rotor assembly of claim 1, wherein the twist angle is selected to optimize one or more clearances between the pitched yoke arms and inner mold line surfaces of the pitched yoke arms.

11. A rotor yoke comprising:
a hub portion comprising a shaft aperture and two teetering hinge cutouts; and
a plurality of pitched yoke arms, each pitched yoke arm coupled to the hub portion and comprising one or more feathering bearings, wherein:
each pitched yoke arm comprises a precone axis that is elevated at a precone angle relative to a plane of rotation of the rotor yoke; and
each pitched yoke arm comprises a twist axis that is twisted at a twist angle relative to the plane of rotation of the rotor yoke.

12. The rotor yoke of claim 11, wherein the precone angle is between two and five degrees.

13. The rotor yoke of claim 11, wherein the twist angle is between fifteen and thirty-five degrees.

14. The rotor yoke of claim 11, wherein:
each pitched yoke arm is aligned along a yoke arm centerline of the rotor yoke; and
the two teetering hinge cutouts are aligned along a teetering axis that is offset at a teetering angle to the yoke arm centerline of the rotor yoke.

15. The rotor yoke of claim 14, wherein the teetering angle is between fifty and ninety degrees.

16. The rotor yoke of claim 11, wherein:
the plurality of pitched yoke arms is two pitched yoke arms; and
each pitched yoke arm comprises two feathering bearings.

17. The rotor yoke of claim 11, wherein the plurality of pitched yoke arms and the hub portion are formed as a single unit.

18. The rotor yoke of claim 11, wherein an in-plane stiffness and an out-of-plane stiffness of each particular pitched yoke arm are coupled.

19. The rotor yoke of claim 11, wherein each particular pitched yoke arm comprises one or more cutouts configured to decrease a stiffness of the particular pitched yoke arm, thereby allowing the particular pitched yoke arm to bend or flex in response to loads.

20. The rotor yoke of claim 11, wherein the twist angle is selected to optimize one or more clearances between the pitched yoke arms and inner mold line surfaces of the pitched yoke arms.

\* \* \* \* \*